June 7, 1955 S. L. SLOMSKI 2,709,872
MANUFACTURE OF CUP TYPE GLASS-TO-METAL SEALS
Filed Oct. 4, 1951 2 Sheets-Sheet 1
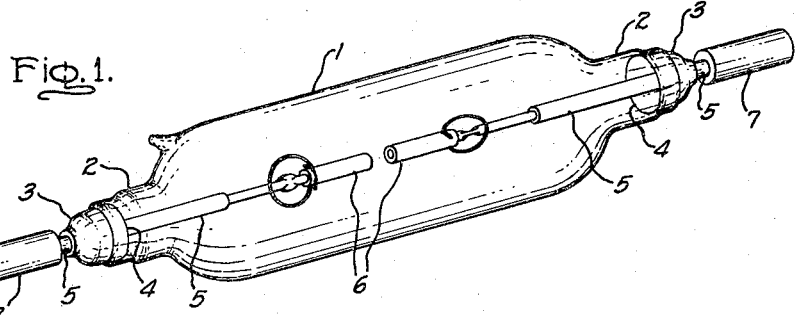
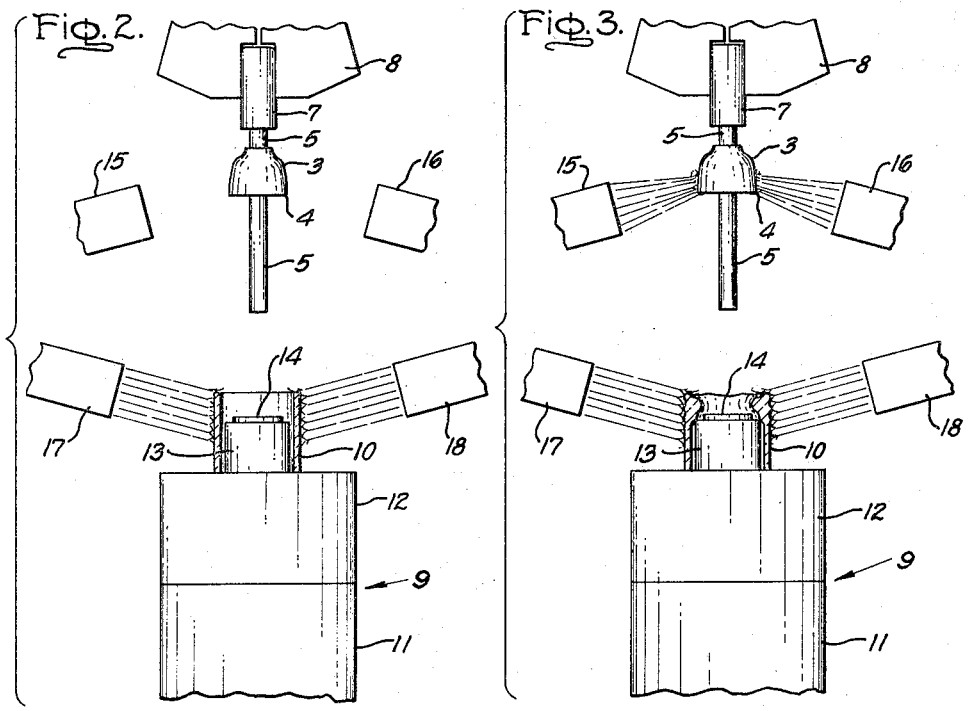
Inventor:
Stanley L. Slomski,
by Kermit C. Kauffman
His Attorney.

June 7, 1955  S. L. SLOMSKI  2,709,872
MANUFACTURE OF CUP TYPE GLASS-TO-METAL SEALS
Filed Oct. 4, 1951  2 Sheets-Sheet 2
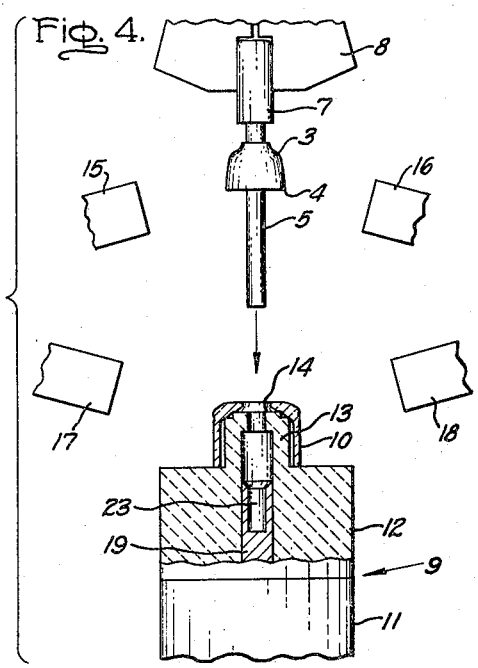
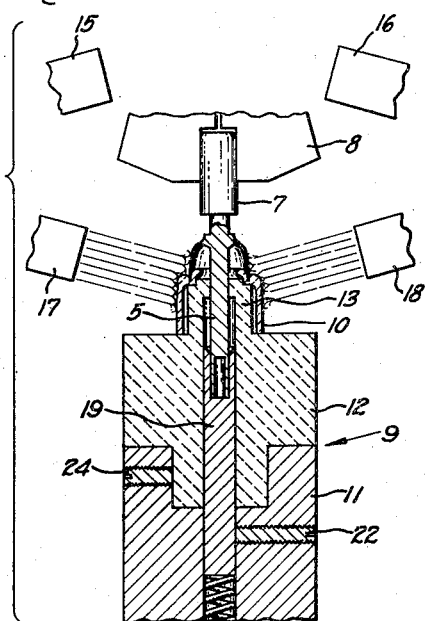
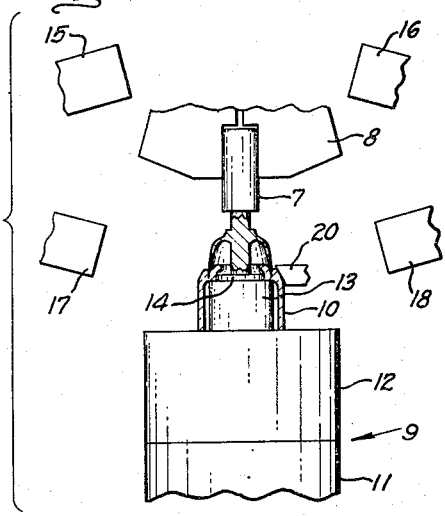
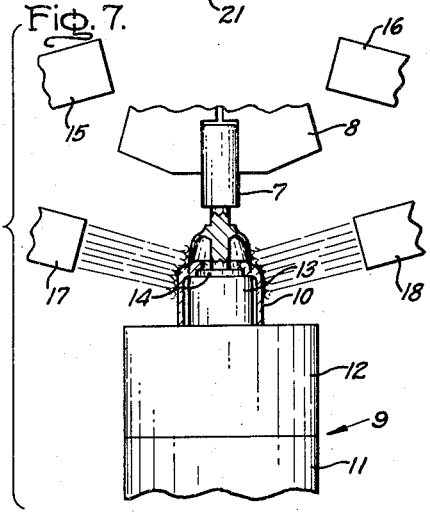
Inventor:
Stanley L. Slomski,
by Vernet C. Kauffman
His Attorney.

2,709,872
Patented June 7, 1955

2,709,872

MANUFACTURE OF CUP TYPE GLASS-TO-METAL SEALS

Stanley L. Slomski, Brooklyn, N. Y., assignor to General Electric Company, a corporation of New York Application October 4, 1951, Serial No. 249,772

5 Claims. (Cl. 49—81)

The present invention relates to electrically conducting seals of the cup seal type and its principal object is to provide an economical mass production method of and a simple means for hermetically uniting the glass and the rim of the metal cup. Other objects and advantages of the invention will appear from the following detailed description of species thereof.

Heretofore in making seals of the above type by mass production methods molded pieces of glass of suitable shape have been used and the rim of the metal cup has been provided with a feathered edge which was embedded in the molded body of glass to make a gas-tight joint therewith. Molding the glass to the required shape adds to the cost of manufacture of the lamps embodying such seals however, and a feature of the present invention is the utilization of inexpensive, mass-produced glass tubing in place of the molded glass pieces in the manufacture of glass-to-metal cup seals.

In the drawings accompanying and forming part of this specification one type of lamp embodying cup seals produced in accordance with the invention and the steps in the new method of producing such seals are illustrated in which Fig. 1 is a perspective view of the lamp and Figs. 2 to 7 are somewhat schematic representations of the seal parts and the parts of the machine used in the method of making the seal.

Referring to Fig. 1 of the drawings, the lamp illustrated comprises a double-ended tubular glass envelope 1 having a necked portion 2 at each end closed by a metal cup 3 having its rim 4 shaped to a feathered edge and hermetically united with the glass neck portion 2. A rod-like metal conductor 5 is brazed gas-tight to and extends through the bottom of each cup 3 and supports an electrode member 6. The electrode members 6 are spaced apart to provide a discharge path in the center portion of the envelope 1. The external ends of the conductors 5 are of large diameter and are in the form of a post 7 for connection to the terminals of a power source for the lamp. Lamps of this type are provided with discharge conducting gaseous atmospheres and are connected to power sources so regulated as to produce between the lamp electrodes a high intensity luminous electric discharge of short duration and rich in actinic light useful for flash photography.

The cups 3 are hermetically united to the glass envelope 1 by the method and the apparatus illustrated in Figs. 2 to 7 in which the post-shaped part 7 of the conductor 5 is gripped by a rotatable chuck 8 which supports the cup 3 in a vertical position and opening downwardly. The chuck 8 is mounted directly above and is movable vertically relative to the rotatable cylindrical support 9 for the glass tube or cylinder 10 to be united with the rim 4 of the cup 3. The chuck 8 and the support 9 are rotated together at the same speed of rotation about a common vertical axis by a gear train (not shown) coupled to these members.

The support 9 includes a metal pillar 11 and a sealing pin part 12 of carbon, for example, the pin 13 of which is in the form of a cylindrical post having on its top surface a raised embossment in the form of a shallow cylindrical step 14. The hollow glass cylinder 10 mounted around the pin 13 and resting on the part 12 is readily fabricated by drawing glass tubing in the usual manner and then cutting the tubing to suitable lengths so that the glass cylinders cut from the tubing extend slightly above the top of the pin 13, as shown.

Stationary gas burners 15, 16, 17 and 18 are so mounted with respect to the chuck 8 and the support 9 as to direct the heating flames produced by burners 15 and 16 against the rim portion 4 of the cup 3 when the chuck 8 is in its raised position, and the flames produced by the burners 17 and 18 against the upper portion of the glass cylinder 10. The heating of these component parts of the cup seal by the burners 15, 16, 17 and 18 takes place in the sequence described below and in accordance with the method of the invention.

In fabricating the seal, and while the chuck 8, in its raised position, and the support 9 are both rotating at a speed of about 20 revolutions per minute, the gas burners 17 and 18, which produce a mixed gas-oxygen flame, are ignited and the flames thereof are directed against the top portion of the glass cylinder 10 (Fig. 2) to heat the glass to its softening temperature. The softened upper part of the glass cylinder 10 starts to collapse downwardly and inwardly over the end of pin 13 and the peripheral portion of step 14 (Fig. 3) in a concentric bead. Just before complete collapse of the heated upper portion of the cylinder 10, the burners 15 and 16, which produce a hydrogen-air flame which is slightly oxidizing to produce a thin film of oxide on the rim 4, are ignited and the flames directed toward the lower portion of cup 3 to heat the rim 4 (Fig. 3) to about the softening temperature of the glass of cylinder 10. When the upper portion of cylinder 10 has collapsed down on the top of pin 13 (Fig. 4) and the rim 4 is up to temperature, all the flames are extinguished and the edge of rim 4 of the cup 3 is immediately rammed into and embedded in the collapsed soft portion of the glass cylinder 10, as shown in Fig. 5, by quickly lowering the chuck 8.

As described hereinafter, the insertion depth of the edge of rim 4 into the soft glass is controlled by the depth control centering guide 19 mounted in the support 9.

After the edge of the rim 4 has been embedded in the soft glass the burners 17 and 18 are re-ignited to heat and again soften the glass around the rim 4. With the flames again extinguished, a molding paddle 20 (Fig. 6) is placed opposite rim 4 and is pressed against the plastic glass to press the glass up against the outer surface of the rim 4 to increase the width of the annular zone of adherence of the glass to the metal. The burners 17 and 18 are again re-ignited to heat the glass until a smooth contour is obtained (Fig. 7) after which the flames are extinguished. At this time most of the oxide on the feathered edge of the rim 4 has dissolved into the glass.

After cooling, the glassed cup 3 is removed from the pin 13; the seal is then complete and the glass portion thereof may be joined by fusion with a glass neck 2 of the tubular envelope 1 shown in Fig. 1 to constitute part of the neck.

As mentioned above, the assembly including the support 9 has a depth control centering guide 19 (Fig. 5) which is adjustable vertically to control within close tolerances the depth of penetration of the cup rim 4 into the softened upper portion of glass cylinder 10. The centering guide 19 is urged upward in the bore of support 9 by the spring 21 pressing against its lower end. The set screw 22 is provided in the pillar 11 to hold the guide 19 in its predetermined set position against the force of the spring 21 and against the force exerted by the end of conductor 5 as the latter is brought downward into the bore of the support 9.

The upper end of the guide 19 has a recess 23 (Fig. 4) for receiving the end portion of conductor 5 and the opening of the recess is flared so as to guide the said end of conductor 5 into the recess. Thus the depth control centering guide 19 may be easily adjusted to control the depth of penetration of the rim 4 and also accurately center the cup assembly with respect to the pin 13 to control the spatial relationships of the glass and metal parts of the cup seal within close tolerances without the need for expensive and complicated machine parts finished to precise dimensions to control the movements of the chuck 8.

The pin bearing part 12 and the metal pillar 11 of the support 9 are held together for rotation by the set screw 24 passing through the upper portion of pillar 11 and engaging the lower portion of part 12 set into the pillar 11 as shown in Fig. 5.

The diameter of the cylindrical graphite pin 13 relative to the inner diameter of the glass cylinder 10 is critical to the success of the present invention because I have discovered that successful seals are produced when the outer diameter of the pin 13 is the same as or preferably not more than about 0.020 inch smaller than the inner diameter of the cylinder. This insures the collapsing of the top of the glass cylinder inwardly in the form of a concentric bead which is of course necessary for the successful carrying out of the method. The cylinder collapses in this manner in spite of the centrifugal force generated by the rotation of the pin because the inner surface of the glass cylinder is uniformly cooled around its circumference by the contiguous or adjacent pin 13 so that said inner surface is maintained at a lower temperature than the temperature of the outer surface which is heated by the flames. Thus, the centrifugal force tending to collapse the heated upper portion of the tube outwardly is overcome and the cylinder collapses inwardly over the end of the pin as illustrated in Figs. 3 and 4 and also over the step 14 on the pin 13 as shown.

The step 14 on the pin 13 is also critical to the success of the method because it produces with the rim 4 of the cup 3, when the latter is rammed into the soft glass, a pumping action which forces the soft glass up into the interior and against the inner surface of the rim 4 to the end that the glass is hermetically united to the inner surface of the rim 4 over an annular zone of sufficient width to provide a mechanically strong joint. As clearly illustrated in the drawings, particularly in Fig. 4, the step or raised embossment 14 has a diameter intermediate the inside diameter of the rim of metal cup 4 and the inside diameter of the concentric bead formed on the upper end thereof. The height to which the step projects over the surface of the pin 13 is less than the thickness of the concentric bead. The paddling of the glass against the outer surface of the rim 4 increases the width of the annular zone of adhesion between the glass and the outer surface of the rim as pointed out above. The strength of the fused metal to glass joint is at its maximum when the distance of the glass line from the edge of the cup is slightly less on the outside than on the inside of the cup.

While the new method is useful for seals including various metals and various glasses, we have found it to be particularly useful in connection with cups made of an iron-nickel-cobalt alloy sold under the trade-mark "Fernico" and with borosilicate hard glass of the type known in the trade as suitable for sealing with "Fernico." To indicate the over-all size of the seal, a glass cylinder 10 having an inner diameter of 15 mm., a length of ⅝ inch and a standard laboratory wall thickness is used.

Obviously, the new method is useful for producing cylindrical seals in which the metal cylinder has a rim similar to rim 4 described above for hermetically uniting with the end of the glass cylinder 10.

What I claim as new and desire to secure by Letters Patent of the United States is:

1. The method of making glass-to-metal seals which comprises the steps of positioning a hollow glass cylinder vertically, heating the outer surface of the upper end portion of the cylinder while effecting cooling of its inner surface to soften the glass progressively from the outer to the inner surface of said end portion, continuing the heating and cooling of said respective surfaces until all the glass at said end portion is softened and collapses inwardly in the form of a concentric bead, supporting the inwardly collapsed soft portion of the cylinder in a position substantially normal to the axis of the cylinder while heating the tapered circular rim of a metal seal member approximately to the softening temperature of the glass, and then ramming the rim into the supported soft plastic portion of the cylinder to embed the rim in the glass and hermetically unite the metal member and the glass cylinder.

2. The method of hermetically uniting a hollow glass cylinder and the rim of a metal cup smaller in diameter than the cylinder which comprises the steps of supporting the cylinder vertically around a heat absorbing body with its inner surface in effective heat exchange relationship with said body and with its upper end portion extending slightly beyond said body, heating the outer surface of the upper end portion of the cylinder to soften the glass progressively from the outer to the inner surface of said end portion, continuing said heating until all the glass at said end portion is softened and collapses inwardly in the form of a concentric bead, supporting the inwardly collapsed soft portion of the cylinder in a position substantially normal to the axis of the cylinder while heating the rim of the metal cup approximately to the softening temperature of the glass, and then ramming the rim into the supported soft plastic portion of the cylinder to embed the rim in the glass and hermetically unite the metal cup and the glass cylinder.

3. The method of hermetically uniting a hollow glass cylinder and the rim of a metal cup which comprises the steps of supporting vertically a hollow glass cylinder of larger inner diameter than the cup rim around a heat absorbing body with the inner surface of said cylinder in effective heat exchange relationship with said body and with the upper end portion of said cylinder extending slightly beyond said body, heating the outer surface of said upper end portion to soften the glass progressively from the outer to the inner surface of said end portion, continuing said heating until all the glass at said end portion is softened and collapses inwardly and downwardly, supporting the inwardly collapsed soft portion of the glass cylinder in a substantially horizontal position on a circular surface having thereon a circular raised embossment slightly smaller in diameter than the rim of the cup while heating said rim approximately to the softening temperature of the glass, ramming the rim into the supported plastic portion of the glass about the embossment to embed the rim in the glass and force the glass within the cup upwardly onto the inner surface of the rim, and thereafter molding the glass on the outside of the rim up onto the outer surface of the rim to provide a mechanically strong gas-tight joint of substantial area between the metal cup and the glass cylinder.

4. The method of claim 1 including in addition rotating the glass cylinder and the metal cup in unison relative to the source of heat used in heating them.

5. The method of claim 3 including in addition rotating the glass cylinder and the metal cup in unison relative to the source of heat used in heating them.

References Cited in the file of this patent

UNITED STATES PATENTS 1,872,070     McCabe et al.            Aug. 16, 1932

(Other references on following page)

UNITED STATES PATENTS

| | | |
|---|---|---|
| 2,229,329 | Kasper | Jan. 21, 1941 |
| 2,422,324 | Watrous, Jr. | June 17, 1947 |
| 2,457,144 | Goodale | Dec. 28, 1948 |
| 2,522,949 | Jarman | Sept. 19, 1950 |
| 2,572,646 | Menzel et al. | Oct. 23, 1951 |
| 2,573,553 | Doran | Oct. 30, 1951 |

FOREIGN PATENTS

| | | |
|---|---|---|
| 106,837 | Australia | Mar. 16, 1939 |
| 892,415 | France | Apr. 6, 1944 |
| 583,502 | Great Britain | Dec. 19, 1946 |
| 584,364 | Great Britain | Jan. 13, 1947 |